US006964728B2

United States Patent
McKinnie et al.

(10) Patent No.: US 6,964,728 B2
(45) Date of Patent: Nov. 15, 2005

(54) SEPARATION PROCESS

(76) Inventors: Bonnie G. McKinnie, 261 Columbia Rd. 10 W., Magnolia, AR (US) 71753; Robert E. Williams, 235 Columbia Rd. 525, Magnolia, AR (US) 71753; Gary L. Sharp, 238 Palmetto Dr., Magnolia, AR (US) 71753; Alireza M. Dadgar, 1500 E. University St., Magnolia, AR (US) 71753

( * ) Notice: Subject to any disclaimer, the term of this patent is extended or adjusted under 35 U.S.C. 154(b) by 0 days.

(21) Appl. No.: 10/147,621

(22) Filed: May 16, 2002

(65) Prior Publication Data
US 2003/0213689 A1 Nov. 20, 2003

(51) Int. Cl.[7] .......................... B01D 3/34; C07C 27/28; C07C 29/80
(52) U.S. Cl. ................. 203/6; 203/19; 203/38; 203/41; 203/47; 203/57; 203/100; 203/DIG. 13; 568/749; 568/890; 568/913
(58) Field of Search .............................. 203/29, 6, 100, 203/50; 568/779, 726, 913, 641; 159/DIG. 20

(56) References Cited

U.S. PATENT DOCUMENTS

| | | | |
|---|---|---|---|
| 2,165,378 A | | 7/1939 | Hickman |
| 3,182,088 A | * | 5/1965 | Hennis ........................ 568/726 |
| 3,234,289 A | * | 2/1966 | Hennis ........................ 568/726 |
| 3,347,937 A | | 10/1967 | Carr et al. |
| 4,302,614 A | * | 11/1981 | Dannenberg et al. ........ 568/641 |
| 4,701,568 A | * | 10/1987 | McKinnie et al. ........... 568/726 |
| 5,395,994 A | * | 3/1995 | Williams et al. ............. 568/913 |
| 5,527,971 A | | 6/1996 | McKinnie |
| 5,723,690 A | | 3/1998 | McKinnie |
| 5,847,232 A | | 12/1998 | McKinnie |
| 6,002,050 A | | 12/1999 | McKinnie |
| 6,084,136 A | | 7/2000 | Holub et al. |
| 6,084,137 A | | 7/2000 | McKinnie et al. |
| 6,300,527 B1 | | 10/2001 | Manimaran et al. |

FOREIGN PATENT DOCUMENTS

| | | |
|---|---|---|
| GB | 1049071 | 11/1966 |
| GB | 2049452 A | 12/1980 |
| WO | 9837046 * | 8/1998 |

* cited by examiner

Primary Examiner—Virginia Manoharan
(74) Attorney, Agent, or Firm—Jeremy J. Kliebert

(57) ABSTRACT

Bisphenol-A-bis(neopentylglycolphosphate) products of enhanced properties and processes for preparing them are described. One of the processes includes (a) mixing and reacting neopentyl glycol and bisphenol-A-bis (dichlorophosphate) in an inert polar organic solvent which (1) if mixed by itself with an equal volume of water at 25° C., will form a separate phase, (2) the solvent by itself will dissolve at least about 10 wt % of bisphenol-A-bis (neopentylglycolphosphate) at a temperature in the range of 25 to 50° C., and optionally but preferably (3) the solvent by itself can be completely vaporized at a temperature below about 180° C.; (b) washing bisphenol-A-bis (neopentylglycolphosphate) product formed in a) while dissolved in inert organic solvent having such characteristics at least once with an aqueous alkaline washing solution; and (c) optionally but preferably, recovering bisphenol-A-bis (neopentylglycolphosphate) product from organic solvent having such characteristics. The reaction of (a) can be conducted in an inert non-polar solvent if that solvent is replaced by an inert polar organic solvent satisfying (1) and (2), and preferably (3). A solvent satisfying (1), (2), and (3) is used when (c) is conducted by distilling or vaporizing off the solvent to recover the bisphenol-A-bis (neopentylglycolphosphate) product as such. The product has a low acid number or a high thermal stability, and usually both.

12 Claims, 1 Drawing Sheet

SEPARATION PROCESS

BACKGROUND

Distillation is a commonly used method for separating and recovering one distillable liquid from another. There are however instances where a mixture of different liquids contains a dissolved substance tending to precipitate from the distillate and thereby cause pluggage of distillation equipment, such as distillation columns.

SUMMARY OF THE INVENTION

This invention is based in part on the discovery that the above pluggage problem can arise when the melting temperature of the dissolved solid component is above the distillation temperature being used to separate one distillable liquid component from one or more residual, non-distilling liquids. Pursuant to this invention, it has been further found that this problem can be avoided by providing to the mixture to be distilled, an adjuvant which forms with the dissolved component a composition that, if isolated, melts at a lower temperature than the distillation temperature to be used for recovering at least one of the distillable liquids from the mixture. The lower melting composition may be a eutectic mixture. However, the proportions of the components in the lower melting composition, whether or not a eutectic mixture, need not be the proportions that form the mixture thereof having the lowest melting temperature—all that is required is that the adjuvant and the higher melting dissolved solid component be proportioned in the solution to form a composition, if isolated, having a melting temperature below that of the distillation temperature to be used for recovering one of the distillable liquids from the mixture.

In a preferred embodiment the adjuvant corresponds to at least one dissolved solid component already present in the solution, such as a by-product or other impurity. This avoids introducing into the solution a component that is not already present, albeit at a smaller concentration. Note that if the component were already present in high enough concentration to form the lower melting composition with the dissolved higher melting solid component, the problem would not arise, and there would be no need to provide an additional amount of such component already present in the solution to be distilled.

Other features and advantages of this invention will be still further apparent from the ensuing description, accompanying drawing, and appended claims.

FURTHER DETAILED DESCRIPTION

Figure 1:
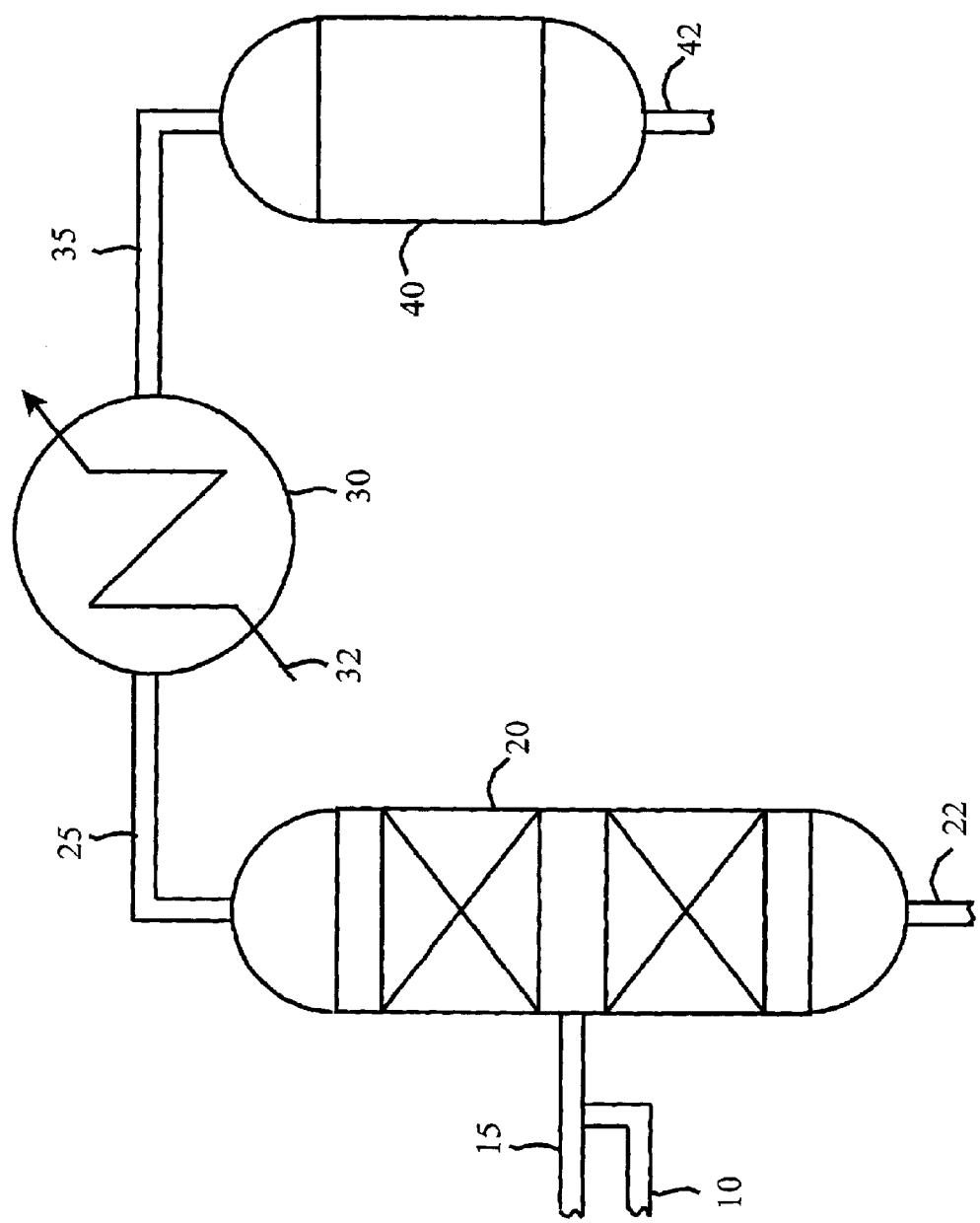
FIG. 1 schematically depicts a distillation system embodying the features of this invention.

For ease of reference, the following terms are sometimes used hereinafter:

"distillable mixture" is the mixture to be subjected to distillation;

"distillable liquid" is a liquid component of the distillable mixture, which component is to be distilled from the distillable mixture;

"dissolved higher melting solid" is a component of (i.e., a solute in) the distillable mixture, such component, if isolated, having a melting temperature above the distillation temperature of the distillable liquid; and "lower melting soluble mixture" is a dissolved solute that, if isolated, melts below the distillation temperature of the distillable mixture.

The prime requirements of the distillable mixture are:

a) the distillable mixture contains at least two different liquid components at least one of which is a distillable liquid;

b) the distillable mixture also contains a dissolved higher melting solid; and c) the dissolved higher melting solid is capable of forming and thus will form with the adjuvant to be used, a soluble mixture or solute, which, if isolated, will constitute a lower melting soluble mixture.

Often the dissolved higher melting solid will be residual amounts of one or more chemical products from a synthesis reaction conducted in the liquid phase of the distillable mixture.

The prime requirements of the adjuvant to be used pursuant to this invention are:

a) the adjuvant can and will form with the dissolved higher melting solid, a solute mixture which, if isolated, will constitute a lower melting soluble mixture; and b) the adjuvant has sufficient solubility in the distillable mixture to be added in an amount needed to form, if isolated, a lower melting soluble mixture with all or substantially all of the amount of dissolved higher melting solid present in the distillable mixture. By "substantially all" is meant that if an amount of dissolved higher melting solid remains in excess, that amount is small enough as to cause no statistically significant increase in column pluggage during usage as compared to an identical column operated under identical conditions for the same period of time with the same liquid mixture except being devoid of any dissolved higher melting solid.

Distillations at atmospheric pressure are preferred in any situation permitting use of distillation. However, in conducting the distillation, reduced pressures, or pressures greater than atmospheric, can be employed whenever deemed necessary or desirable.

Various mixtures of distillable liquid components can make up the liquid phase of the distillable mixtures utilized in the practice of this invention, provided at least one of such liquid components is a distillable liquid. More than one such component can be distillable, and in such case the boiling temperature(s) of each distillable component to be removed by distillation from the distillable mixture should be above the temperature at which the lower melting soluble mixture would solidify, if isolated from the distillable mixture. The distillable mixtures can also contain one or more liquid components which are not distillable or which, if distillable, are not intended or planned to be distilled from the original distillable mixture, all provided that no such component will interfere with the formation of the solute mixture that, if isolated, would constitute a lower melting soluble mixture or otherwise interfere with the distillation. Thus the liquid components of the distillable mixture can comprise water and one or more liquid hydrocarbons, ethers, esters, nitrites, amines, amides, ketones, sulfones, sulfoxides, or other organic substances which are liquid at ordinary ambient room temperatures, or a mixture of two or more organic components at least one of which is to be distilled from the other(s). Various reference publications are available to anyone seeking information about such materials. For example, one may refer to *CRC Handbook of Chemistry and*

*Physics*, 63rd Edition, CRC Press, Inc., Boca Raton, Fla., copyright 1982, for information about physical states, boiling temperatures and solubilities of numerous chemical substances. Other suitable reference works, of course, also exist.

This invention is especially useful in recovering a distillable organic solvent that is dissolved in water where the mixture is a mother liquor remaining after physically removing a solid product formed in that solvent mixture. Non-limiting examples of such water-soluble distillable solvents are alcohols such as ethyl alcohol, propyl alcohol, isopropyl alcohol, and tert-butyl alcohol; ethers such as tetrahydrofuran, 1-ethoxypropane, 2-ethoxypropane, p-dioxane, and m-dioxane; ketones such as acetone and 2-butanone; amides such as N,N-dimethylformamide and N,N-diethylformamide; esters such as methyl formate, methyl glycolate, and methyl acetoacetate; amines such as cyclohexylamine and N-methylcyclohexylamine; and nitrites such as acetonitrile and propionitrile. In mixtures involving water and a distillable organic solvent, it is preferable that the distillable organic solvent boil at a temperature below the boiling temperature of water. But where the water is the distillable liquid, the organic solvent can subsequently be distilled and recovered, leaving a residue of the lower melting soluble mixture.

Numerous compounds exist that can be formed in and remain dissolved in the two or more liquid components referred to above. Thus the dissolved higher melting solid can be any compound that is soluble enough to be dissolved in liquid components of the distillable mixture, that is stable at least up to the distillation temperature to be used (and preferably above that temperature), and that can form a lower melting soluble mixture with the adjuvant.

The adjuvant used will of course depend upon the dissolved higher melting solid present in the distillable mixture. Other than being a solid at ordinary ambient room temperatures, the adjuvant used must have the capability of forming with the dissolved higher melting solid, a dissolved composition having a melting temperature, if isolated, that is below both the melting temperature of the dissolved higher melting solid and the distillation temperature to be used in the distillation to be conducted.

The practice and advantages of this invention will now be illustrated with reference to FIG. 1. It will be seen that the apparatus depicted includes a distillation column 20 into which flows via line 15 a liquid mixture from which a distillable liquid component is to be separated and recovered. Column 20 can be of any conventional type and configuration suitable for effecting the particular separation to be carried out. The vaporized distillate exits from column 20 and is transferred via line 25 to condenser 30. Condenser 30 is cooled by some appropriate cooling medium circulated in line 32. The condensed distillate is transmitted via line 35 to receiver 40 for storage or reuse by means of line 42. Line 10 serves as the feed line for an adjuvant of this invention. Line 22 can be used to remove the lower melting soluble mixture form column 20. Flows in the lines of the system can be effectuated by pumps (not shown).

The liquid mixture in line 15 upstream from the junction of lines 15 and 10, which mixture can originate from any source, contains at least two different liquid components, at least one of which is to be separated and recovered in purified form. For purposes of this illustration, the liquid mixture is a mixture of ethyl alcohol and water, and among the dissolved components is 2,2-propylenebis[4,4'-(2,6-dibromophenol)], the higher melting solid, with a melting temperature of about 180° C., and also smaller amounts of tribromophenols and still smaller amounts of dibromophenols. The dissolved mononuclear tribromophenol has a melting temperature of about 94° C. Column 20 is operated at a temperature of about 110° C. To prevent pluggage of column 20, an adjuvant of this invention, viz., additional tribromophenol dissolved or slurried in ethyl alcohol, is fed via line 10 and thence with the above liquid mixture into column 20 via line 15. The amount of tribromophenol fed into the column is sufficient to produce a mixture with the 2,2-propylenebis[4,4'-(2,6-dibromophenol)] and the mononuclear bromophenols initially present which mixture, if isolated from solution, is in the molten state at less than 110° C. Hence column pluggage, which would occur in the absence of the adjuvant feed, is avoided.

In another embodiment of the invention, described with reference to FIG. 1, the system schematically depicted and described above is again used in the same manner with the following adjustments. First, the liquid mixture in line 15 upstream from the intersection of lines 15 and 10 additionally contains dissolved elemental bromine. Secondly, instead of feeding a solution or slurry of tribromophenol adjuvant in ethyl alcohol, the feed in line 10 is molten phenol. The phenol is brominated in situ to form tribromophenol adjuvant so that a lower melting composition involving the 2,2-propylenebis[4,4'-(2,6-dibromophenol)] is formed. Small amounts of tribromophenol can already be present in the initial mixture, and when they are initially present, a further impurity is not introduced or formed in this system.

Compounds referred to by chemical name or formula anywhere in this document, whether referred to in the singular or plural, are identified as they exist prior to coming into contact with another substance referred to by chemical name or chemical type (e.g., another component, a solvent, or etc.). It matters not what preliminary chemical changes, if any, take place in the resulting mixture or solution, as such changes are the natural result of bringing the specified substances together under the conditions called for pursuant to this disclosure. Also, even though the claims may refer to substances in the present tense (e.g., "comprises", "is", etc.), the reference is to the substance as it exists at the time just before it is first contacted, blended or mixed with one or more other substances in accordance with the present disclosure.

All documents referred to herein are incorporated herein in toto as if fully set forth in this document.

This invention is susceptible to considerable variation within the spirit and scope of the appended claims. Therefore the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

That which is claimed is:

1. A process which comprises distilling in a column a distillable liquid from a liquid mixture, said liquid mixture comprising (i) said distillable liquid, (ii) one or more liquid component(s) other than said distillable liquid, and (iii) dissolved solid component(s), comprised of 2,2-propylenebis[4,4'-(2,6-dibromophenol)], wherein said distilling is conducted at a temperature at which said distillable liquid is being distilled from said liquid mixture, wherein said dissolved solid component(s) tend(s) to precipitate from the distillate and thereby cause pluggage in the distillation column, and wherein there is added to said liquid mixture an amount of tribromophenol which forms with said dissolved solid component(s) a composition that melts below the temperature at which said distillable liquid distills, the amount of tribromophenol added to said liquid mixture being an amount which forms with substantially all of said dissolved solid component(s) a composition that melts below the temperature at which said distillable liquid is being distilled, so that said pluggage is minimized or avoided.

2. The process according to claim 1 wherein said dissolved solid component(s) further comprise(s) tribromophenol in an amount that is not high enough to form with substantially all of said dissolved solid component(s) a composition that melts below the temperature at which said distillable liquid is being distilled.

3. The process according to claim 1 wherein said adjuvant is formed in situ.

4. A process which comprises distilling in a column a distillable liquid from a liquid mixture, said liquid mixture being a mother liquor remaining after physically removing a solid product formed in that liquid mixture, said liquid mixture comprising (i) said distillable liquid, (ii) one or more liquid components(s) other than said distillable liquid, and (iii) dissolved solid component(s), wherein said distilling is conducted at a temperature at which said distillable liquid is being distilled from said liquid mixture, wherein said dissolved solid component(s) tend(s) to precipitate from the distillate and thereby cause pluggage in the distillation column, and wherein there is added to said liquid mixture an amount of an adjuvant which forms with said dissolved solid components(s) a composition that melts below the temperature at which said distillable liquid distills, the amount of adjuvant added to said liquid mixture being an amount which forms with substantially all of said dissolved solid component(s) a composition that melts below the temperature at which said distillable liquid is being distilled, so that said pluggage is minimized or avoided.

5. The process according to claim 4 wherein said distillable liquid is an organic solvent that is at least partially dissolved in water.

6. The process according to claim 1, 3, 4 or wherein said distilled liquid is ethyl alcohol.

7. A process which comprises distilling in a column a water-soluble distillable liquid that boils below the boiling temperature of water from a liquid mixture comprised of (i) said water-soluble distillable liquid, (ii) water, and (iii) dissolved solid component(s) comprised of 2,2—propylenebis[4,4'—(2,6—dibromophenol)], wherein said distilling is conducted at a temperature at which water-soluble distillable liquid is being distilled from the liquid mixture, wherein said dissolved solid component(s) tend(s) to precipitate from distillate of water-soluble distillable liquid and thereby cause pluggage in the distillation column, and wherein there is added to said liquid mixture an amount of tribromophenol that is soluble in said liquid mixture and which forms with said dissolved solid component(s) a composition that melts below the temperature at which said water-soluble distillable liquid is being distilled, the amount of tribromophenol added to said liquid mixture being an amount which forms with substantially all of said dissolved solid component(s) a composition that melts at a temperature below the temperature at which said water-soluble distillable liquid is being distilled, so that said pluggage is minimized or avoided.

8. The process according to claim 7 wherein said solid component is 2,4,6-tribromophenol, and wherein said water-soluble distillable liquid is ethanol.

9. The process according to claim 8 wherein the temperature at which the ethanol is being distilled is about 110° C.

10. A process which comprises distilling in a column a distillable liquid from a liquid mixture, said liquid mixture comprising (i) said distillable liquid, (ii) one or more liquid component(s) other than said distillable liquid, and (iii) dissolved solid component(s) comprised of 2,2-propylenebis[4,4'-(2,6-dibromophenol)] and a small amount of tribromophenol, wherein said distilling is conducted at a temperature at which said distillable liquid is being distilled from said liquid mixture, wherein said dissolved solid component(s) tend(s) to precipitate from the distillate and thereby cause pluggage in the distillation column, and wherein there is formed in situ in said liquid mixture an amount of tribromophenol which, together with said small amount of tribromophenol, forms with substantially all of said dissolved solid component(s) a composition that melts below the temperature at which said distillable liquid is being distilled, so that said pluggage is minimized or avoided, said small amount of tribromophenol not being high enough to form with substantially all of said dissolved solid component(s) a composition that melts below the temperature at which said distillable liquid is being distilled.

11. A process which comprises distilling in a column a distillable liquid from a liquid mixture, said liquid mixture comprising (i) said distillable liquid, (ii) bromine, (iii) one or more liquid component(s) other than said distillable liquid and bromine, and (iv) dissolved solid component(s) comprised of 2,2-propylenebis[4,4'-(2,6-dibromophenol)], wherein said distilling is conducted at a temperature at which said distillable liquid is being distilled from said liquid mixture, wherein said dissolved solid component(s) tend(s) to precipitate from the distillate and thereby cause pluggage in the distillation column, and wherein there is added to said liquid mixture molten phenol which is brominated in situ to form tribromophenol which forms with said dissolved solid component(s) a composition that melts below the temperature at which said distillable liquid is being distilled, the amount of tribromophenol formed in said liquid mixture being an amount which results in substantially all of said dissolved solid component(s) being converted into a composition that melts at a temperature below the temperature at which said distillable liquid is being distilled, so that said pluggage is minimized or avoided.

12. The process according to claim 11 wherein said dissolved solid component(s) further comprise(s) tribromophenol in an amount that is not high enough to form with substantially all of said dissolved solid component(s) a composition that melts below the temperature at which said distillable liquid is being distilled.

\* \* \* \* \*